(12) United States Patent
Karimi et al.

(10) Patent No.: US 12,379,123 B1
(45) Date of Patent: *Aug. 5, 2025

(54) SYSTEMS AND METHODS FOR ADJUSTING DETECTED TEMPERATURE FOR A CLIMATE CONTROL SYSTEM

(71) Applicant: Trane International Inc., Davidson, NC (US)

(72) Inventors: Behrooz Karimi, Tyler, TX (US); Youssef A. Jaber, Tyler, TX (US)

(73) Assignee: Trane International Inc., Davidson, NC (US)

( * ) Notice: Subject to any disclaimer, the term of this patent is extended or adjusted under 35 U.S.C. 154(b) by 608 days.

This patent is subject to a terminal disclaimer.

(21) Appl. No.: 17/659,311

(22) Filed: Apr. 14, 2022

Related U.S. Application Data

(63) Continuation of application No. 16/810,365, filed on Mar. 5, 2020, now Pat. No. 11,333,384.

(51) Int. Cl.
| | |
|---|---|
| *F24F 11/63* | (2018.01) |
| *F24F 110/10* | (2018.01) |
| *G05B 13/04* | (2006.01) |
| *G06F 17/18* | (2006.01) |

(52) U.S. Cl.
CPC ............ *F24F 11/63* (2018.01); *G05B 13/048* (2013.01); *G06F 17/18* (2013.01); *F24F 2110/10* (2018.01)

(58) Field of Classification Search
CPC ..... F24F 11/63; F24F 2110/10; G05B 13/048; G06F 17/18
See application file for complete search history.

(56) References Cited

U.S. PATENT DOCUMENTS

| | | |
|---|---|---|
| 3,817,453 A | 6/1974 | Pinckaers |
| 4,741,476 A | 5/1988 | Russo et al. |
| 5,199,637 A | 4/1993 | Adams |
| 5,611,484 A | 3/1997 | Uhrich |
| 7,044,637 B2 | 5/2006 | O'Neill et al. |

(Continued)

FOREIGN PATENT DOCUMENTS

| | | |
|---|---|---|
| EP | 0278372 A2 | 8/1988 |
| WO | 169341 A2 | 9/2001 |
| WO | 2009073590 A1 | 6/2009 |

OTHER PUBLICATIONS

Hans Lundstrom et al., "Radiation influence on indoor air temperature sensors: Experimental evaluation of measurement errors and improvement methods", Experimental Thermal and Fluid Science 115 (2020), p. 1-13.

*Primary Examiner* — Alexander Satanovsky
(74) *Attorney, Agent, or Firm* — Womble Bond Dickinson (US) LLP

(57) ABSTRACT

Methods and related systems are disclosed for determining a temperature of an indoor space with a plurality of onboard sensors of a device of a climate control system. In an embodiment, the method includes detecting raw temperatures with the plurality of sensors. In addition, the method includes determining a combined temperature offset for a first sensor of the plurality of sensors based on outputs of a plurality of models. The plurality of models are to determine a plurality of temperature offsets for the first sensor based on different airflow directions relative to the device. Further, the method includes adjusting the raw temperature detected by the first sensor with the combined temperature offset.

16 Claims, 6 Drawing Sheets

(56) References Cited

U.S. PATENT DOCUMENTS

| | | |
|---|---|---|
| 7,364,353 B2 | 4/2008 | Kolk |
| 8,280,673 B2 | 10/2012 | Aljabari |
| 8,949,066 B2 | 2/2015 | Aljabari |
| 8,954,288 B2 | 2/2015 | Aljabari |
| 9,326,323 B2 | 4/2016 | Aljabari |
| 9,335,769 B2 | 5/2016 | Aljabari et al. |
| 9,345,066 B2 | 5/2016 | Aljabari |
| 9,360,229 B2 | 6/2016 | Modi et al. |
| 9,765,984 B2 | 9/2017 | Smith et al. |
| 10,107,693 B2 | 10/2018 | Hofer |
| 10,154,541 B2 | 12/2018 | Aljabari |
| 10,209,688 B2 | 2/2019 | Stefanski et al. |
| 10,222,271 B2 | 3/2019 | Aljabari et al. |
| 2001/0042792 A1 | 11/2001 | Kline et al. |
| 2002/0045806 A1* | 4/2002 | Baker, Jr. ............ A61B 5/02416 600/323 |
| 2005/0209813 A1* | 9/2005 | Kautz .................... G01K 7/427 374/E7.042 |
| 2006/0027973 A1 | 2/2006 | Nireki et al. |
| 2006/0074586 A1 | 4/2006 | Kautz et al. |
| 2006/0165149 A1 | 7/2006 | Koltz |
| 2006/0279734 A1 | 12/2006 | Yan et al. |
| 2007/0295713 A1 | 12/2007 | Carlton-Foss |
| 2013/0151019 A1* | 6/2013 | Federspiel ............... F24F 11/30 700/276 |
| 2015/0134123 A1* | 5/2015 | Obinelo ................. G05B 15/02 700/277 |
| 2016/0003507 A1 | 1/2016 | Kim et al. |
| 2016/0350773 A1 | 12/2016 | Sullivan et al. |
| 2019/0069344 A1 | 2/2019 | Aljabari |
| 2019/0178511 A1 | 6/2019 | Zimmerman et al. |
| 2021/0011443 A1* | 1/2021 | Mcnamara ........... F24F 11/0001 |
| 2022/0178764 A1* | 6/2022 | Van Der Tempel ... H05B 45/18 |

\* cited by examiner

SYSTEMS AND METHODS FOR ADJUSTING DETECTED TEMPERATURE FOR A CLIMATE CONTROL SYSTEM

CROSS-REFERENCE TO RELATED APPLICATIONS

This present application is a continuation of U.S. patent application Ser. No. 16/810,365 filed on Mar. 5, 2020 entitled "SYSTEMS AND METHODS FOR ADJUSTING DETECTED TEMPERATURE FOR CLIMATE CONTROL SYSTEM," which is hereby incorporated by reference in its entirety.

STATEMENT REGARDING FEDERALLY SPONSORED RESEARCH OR DEVELOPMENT

Not applicable.

BACKGROUND

A climate control system, such as a heating, ventilation, and air conditioning (HVAC) system, may control the environmental conditions (e.g., temperature, relative humidity, etc.) of an indoor space. A climate control system may include a thermostat that may receive user inputs (e.g., such as a desired indoor temperature and relative humidity) and detect the environmental conditions of the indoor space. Accordingly, a thermostat may include a temperature sensor that is used to monitor a temperature of the indoor space, and these temperature measurements may be utilized to determine whether and/or how to operate the climate control system.

BRIEF SUMMARY

Some embodiments disclosed herein are directed to a method of determining a temperature of an indoor space with a plurality of onboard sensors of a device of a climate control system. In an embodiment, the method includes detecting raw temperatures with the plurality of sensors. In addition, the method includes determining a combined temperature offset for a first sensor of the plurality of sensors based on outputs of a plurality of models. The plurality of models are configured to determine a plurality of temperature offsets for the first sensor based on different airflow directions relative to the device. Further, the method includes adjusting the raw temperature detected by the first sensor with the combined temperature offset.

Other embodiments dis closed herein are directed to a non-transitory machine-readable medium. In an embodiment, the machine-readable medium, when executed by a processor, causes the processor to: (a) receive signals from a plurality of sensors within a device of a climate control system, wherein the signals are indicative of temperatures of an indoor space detected by the plurality of sensors; (b) determine a combined temperature offset for a first sensor of the plurality of sensors based on outputs of a plurality of models, wherein the plurality of models are configured to determine a plurality of temperature offsets for the first sensor based on different airflow directions relative to the device; and (c) adjust the raw temperature detected by the first sensor by the combined temperature offset.

Still other embodiments disclosed herein are directed to a device for monitoring ambient indoor temperature. In an embodiment, the device includes a housing, a plurality of temperature sensors disposed within the housing, and a processor operatively coupled to the plurality of temperature sensors. The processor is configured to: receive raw temperature signals from the plurality of sensors, determine a temperature offset for the raw temperature signal from a first sensor of the plurality of sensors based on a direction of airflow relative to the housing from a plurality of models that are configured to determine a plurality of temperature offsets for the first sensor based on different airflow directions relative to the housing, and adjust the raw temperature signal from the first sensor by the temperature offset.

Embodiments described herein comprise a combination of features and characteristics intended to address various shortcomings associated with certain prior devices, systems, and methods. The foregoing has outlined rather broadly the features and technical characteristics of the dis closed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
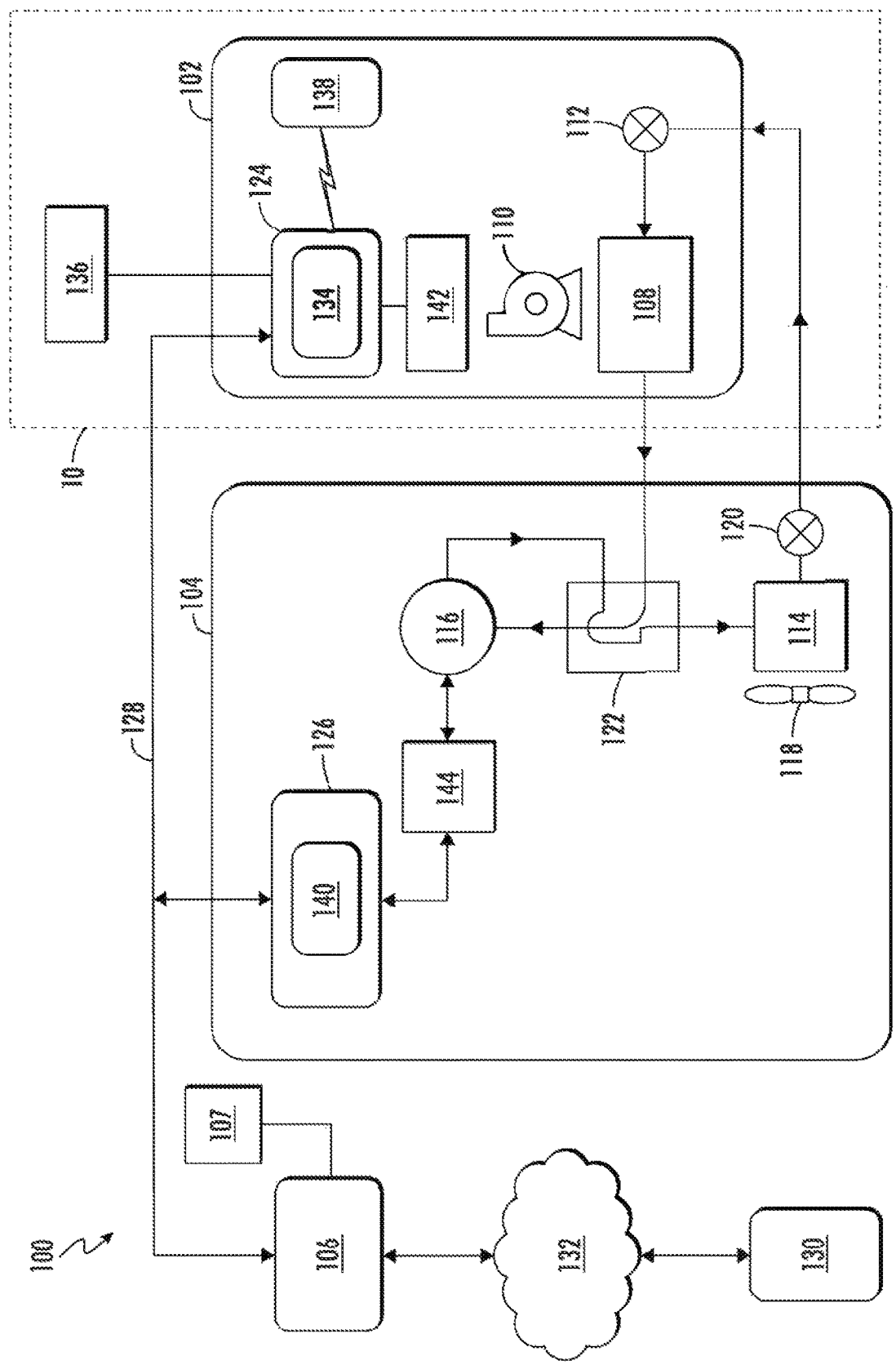
FIG. 1 is a diagram of a HVAC system configured for operating in a cooling mode according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10% unless otherwise stated herein.

As used herein, a "climate control system" may refer to any system, device, or collection of devices that is configured to alter a temperature and/or a humidity within an indoor space (e.g., an interior space of a home, office, retail store, etc.). For instance, the term "climate control system" specifically includes an air conditioning system, a heat pump system, a furnace (e.g., a gas fired furnace, electric furnace, etc.), etc.

As previously described, a thermostat of a climate control system may include a temperature sensor that is configured to monitor the ambient temperature of the indoor space such that the climate control system may be effectively and efficiently operated to control the environmental conditions within the indoor space. However, other components within the thermostat (e.g., a display, processors, memories, etc.) may generate heat during operations. As a result, the temperatures detected by the temperature sensor may be elevated and thus may not reflect the actual temperatures within the indoor space. In addition, airflow across and/or around the thermostat may drive convective heat transfer within and around the thermostat, thereby further altering the temperatures detected by the temperature sensor from the true or actual temperature of the indoor space. As a result accurate and efficient operation of the climate control system may be frustrated. Accordingly, embodiments disclosed herein include systems and methods for correcting the temperature measured by an onboard sensor of a thermostat or other suitable device associated with a climate control system so as to help ensure efficient and desired operation of the climate control system.

Referring now to FIG. 1, a schematic diagram of a climate control system 100 according to some embodiments is shown. In this embodiment, climate control system 100 is an HVAC system, and thus, system 100 may be referred to herein as HVAC system 100. In the illustrated example, HVAC system 100 comprises a heat pump system that may be selectively operated to implement one or more substantially closed thermodynamic refrigeration cycles to provide a cooling functionality (hereinafter "cooling mode") and/or a heating functionality (hereinafter "heating mode") for an indoor space 10. In other embodiments, the HVAC system may be configured as an air conditioner that does not provide a heating mode via a refrigeration cycle. In yet other embodiments, the HVAC system could be, or include, a heating system such as a furnace, electric heater, or radiator. The HVAC system 100, configured as a heat pump system, generally comprises an indoor unit 102, an outdoor unit 104, and a system controller 106 that may generally control operation of the indoor unit 102 and/or the outdoor unit 104. In some embodiments, the indoor unit 102 and the outdoor unit 104 may be located within the same housing, often exterior to the interior space 10. Systems where the indoor unit 102 and the outdoor unit 104 are housed together are often referred to as packaged units.

Indoor unit 102 generally comprises an indoor air handling unit comprising an indoor heat exchanger 108, an indoor fan 110, an indoor metering device 112, and an indoor controller 124. In some embodiments, one or more of the components of indoor unit 102 may be disposed within the indoor space 10; however, it should be appreciated that some or all of the components of indoor unit 102 may be disposed outside of indoor space 10. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of an indoor space. The indoor fan 110 may alternatively comprise a mixed-flow fan and/or any other suitable type of fan. The indoor fan 110 may generally be configured as a modulating and/or variable speed fan capable of being operated at many speeds over one or m re ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdo or heat exchanger 114, a compressor 116, an outdoor fan 118, an outdoor metering device 120, a reversing valve 122, and an outdoor controller 126. In some embodiment s, one or more of the components of outdoor unit 104 may be disposed outside of the indoor space 10; however, it should be appreciated that one or more of the components of outdoor unit 104 may be disposed within the indoor space 10. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages or tubing of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiment s, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the indoor heat exchanger 108. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. In some embodiments, the system controller 106 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with HVAC system 100. In some embodiments, the HVAC system 100 may include a sensor (or plurality of sensors) for sensing or detecting the ambient outdoor temperature. Additionally, in some embodiments, the system controller 106 may be configured to control heating and/or cooling of zones associated with the HVAC system 100 (e.g., within the indoor space).

The system controller 106 may also be in communication with or incorporated with an input/output (I/O) unit 107 (e.g., a graphical user interface, a touchscreen interface, or the like) for displaying information and for receiving user inputs. The I/O unit 107 may display information related to the operation of the HVAC system 100 (e.g., from system controller 106) and may receive user inputs related to operation of the HVAC system 100. During operations, I/O unit 107 may communicate received user inputs to the system controller 106, which may then execute control of HVAC system 100 accordingly. Communication between the I/O unit 107 and system controller 106 may be wired, wireless, or a combination thereof. In some embodiments, the I/O unit 107 may further be operable to display information and receive user inputs tangentially and/or unrelated to operation of the HVAC system 100. In some embodiments, however, the I/O unit 107 may not comprise a display and may derive all information from inputs from remote sensors and remote configuration tools (e.g., remote computers, servers, smartphones, tablets, etc.). In some embodiments, system controller 106 may receive user inputs from remote configuration tools, and may further communicate information relating to HVAC system 100 to I/O unit 107. In these embodiments, system controller 106 may or may not also receive user inputs via I/O unit 107. In some embodiments, the system controller 106 and/or the I/O unit 107 may be embodied in a thermostat that may be disposed within the indoor space (e.g., thermostat 150 discussed below). As will be described in more detail below, such a thermostat (not specifically shown in FIG. 1 or 2) may include a plurality of onboard temperature sensors for determining the temperature of the indoor space during operations.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 an d/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be con figured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be con figured to communicate with and/or control a compressor drive controller 144 that is configured to electrically power and/or control the compressor 116.

System controller 106, indoor controller 124, and outdoor controller 126 (as well as compressor drive controller 144, indoor fan controller 142, indoor EEV controller 138, I/O unit 107, etc.) may each comprise any suitable device or assembly which is capable of receiving electrical (or other data) signals and transmitting electrical (or other data) signals to other devices. In particular, while not specifically shown, system controller 106, indoor controller 124, and outdoor controller 126 (as well as controllers 138, 142, 144, I/O unit 107, etc.) may each include a processor and a memory. The processors (e.g., microprocessor, central processing unit, or collection of such processor devices, etc.) may execute machine-readable instructions provided on the corresponding memory (e.g., non-transitory machine-readable medium) to provide the processor with all of the functionality described herein. The memory of each controller 106, 124, 126 (as well as controllers 138, 142, 144, I/O unit 107, etc.) may comprise volatile storage (e.g., random access memory), non-volatile storage (e.g., flash storage, read only memory, etc.), or combinations of both volatile and non-volatile storage. Data consumed or produced by the machine-readable instructions can also be stored on the memory of controllers 106, 124, 126 (as well as controllers 138, 142, 144, I/O unit 107, etc.).

As shown in FIG. 1, the HVAC system 100 is configured for operating in a so-called cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow to the reversing valve 122, where the reversing valve 122 may be selectively configured to divert the refrigerant back to the compressor 116, where the refrigeration cycle may begin again.

Figure 2:
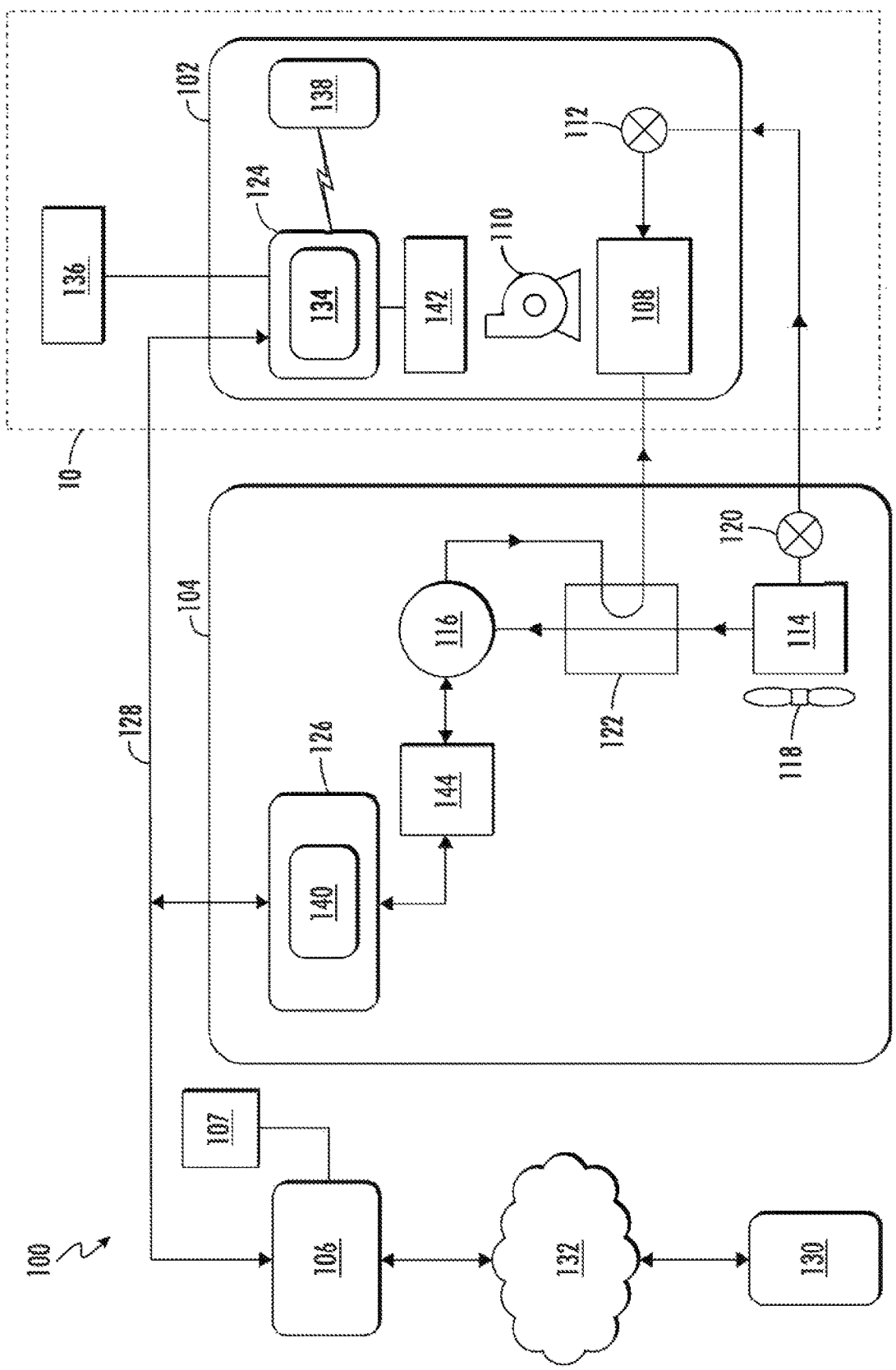
FIG. 2 is a diagram of the HVAC system of FIG. 1 configured for operating in a heating mode according to some embodiments.

Reference is now made to FIG. 2, which shows the HVAC system 100 configured for operating in a so-called heating mode. Most generally, the roles of the indoor heat exchanger 108 and the outdoor heat exchanger 114 are reversed as compared to their operation in the above-described cooling mode. For example, the reversing valve 122 may be controlled to alter the flow path of the refrigerant from the compressor 116 to the indoor heat exchanger 108 first and then to the outdoor heat exchanger 114, the outdoor metering device 120 may be enabled, and the indoor metering device 112 may be disabled and/or bypassed. In heating mode, heat may generally be absorbed by refrigerant at the outdoor heat exchanger 114 and rejected by the refrigerant at the indoor heat exchanger 108. As the refrigerant is passed through the outdoor heat exchanger 114, the outdoor fan 118 may be operated to move air into contact with the outdoor heat exchanger 114, thereby transferring heat to the refrigerant from the air surrounding the outdoor heat exchanger 114. Additionally, as refrigerant is passed through the indoor heat exchanger 108, the indoor fan 110 may be operated to move air into contact with the indoor heat exchanger 108, thereby transferring heat from the refrigerant to the air surrounding the indoor heat exchanger 108.

Figure 3:
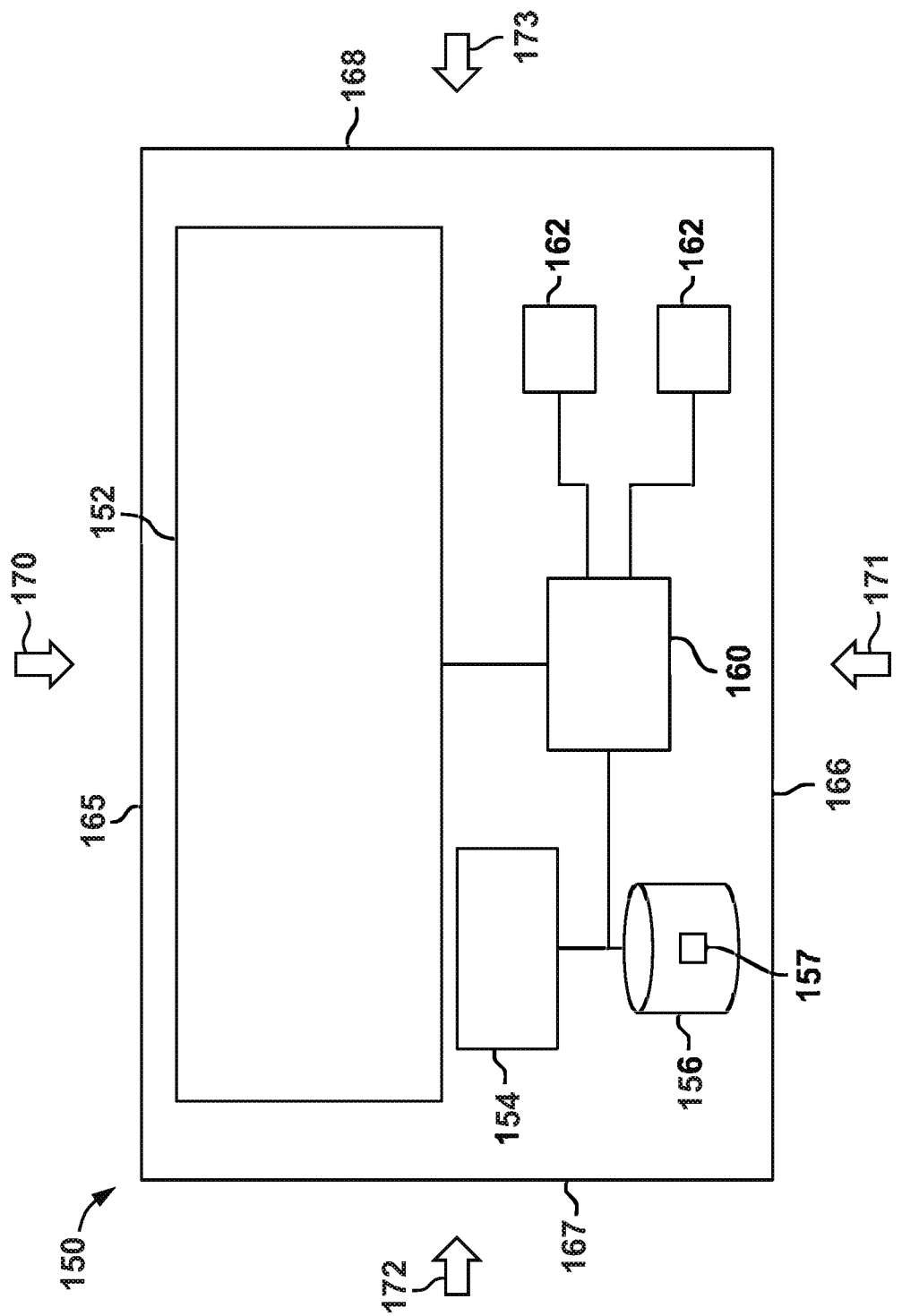
FIG. 3 is a diagram of a thermostat for use with the HVAC system of FIG. 1 according to some embodiments.

Referring now to FIG. 3, a thermostat 150 is shown that may be utilized within HVAC system 100 (see e.g., FIG. 1). As previously described above, in some embodiments, thermostat 150 may embody the system controller 106, I/O unit 107, indoor controller 124, or a combination thereof. In other embodiments, thermostat 150 may be a separate device from the system controller 106, I/O unit 107, indoor controller 124, etc., but may be configured to communicate (e.g., via wired and/or wireless communication) with these components. In some embodiments, thermostat 150 may include a display 152, a processor 160, a memory 156, a power source 154, and a plurality of onboard temperature sensors 162.

When present, display 152 may be an electronic display that is configured to project or display images generated by signals from an associated electronic device (e.g., processor 160). Display 152 may comprise any suitable display (or combination thereof), such as, for example, a liquid crystal display (LCD), an organic light emitting diode (OLEO) display, an electrophoretic display, a plasma display, etc. In some embodiments, display 152 is a touch sensitive display. In some embodiments, thermostat 150 may not include a display 152.

The processor 160 (e.g., microprocessor, central processing unit, or collection of such processor devices, etc.) executes machine-readable instructions 157 (e.g., non-transitory machine-readable medium) provided on memory 156 to provide the processor 160 with all of the functionality described herein (or some portion thereof). The memory 156 may comprise volatile storage (e.g., random access memory), non-volatile storage (e.g., flash storage, read only memory, etc.), or combinations of both volatile and non-volatile storage. Data consumed or produced by the machine-readable instructions 157 can also be stored on memory 156.

Power source 154 provides electrical power to other electronic components within thermostat 150 (e.g., processor 160, memory 156, temperature sensors 162, display 152, etc.). Power source 154 may comprise any suitable source of electrical power such as, for example, a battery, capacitor, a converter or transformer, etc. In addition, in some examples, thermostat 150 may also receive electrical power from wires or other conductors coupled to an electrical power supply for the indoor space (e.g., indoor space 10). Therefore, in some examples, power source 154 is not included in thermostat 150, and all electrical power is supplied to thermostat 150 from the electrical power supply for the indoor space.

Temperature sensors 162 may each comprise any suitable device or collection of devices for measuring a temperature (or value(s) indicative thereof) of an environment adjacent to each temperature sensor 162. For instance, temperature sensors 162 may comprise a thermos-couples, thermistors, infrared sensors, etc. More specifically, because the thermostat 150 is disposed with in the indoor space, the temperature sensors 162 may be configured to detect the temperature of the indoor space (e.g., indoor space 10), specifically the portion of the indoor space that immediately surrounds the thermostat 150 (as well as within the thermostat 150 itself). In some embodiments, thermostat 150 may include two temperature sensors 162; however, in other embodiments, thermostat 150 may include more than two temperature sensors 162, such as, for instance, three temperature sensors 162, four temperature sensors 162, five temperature sensors 162, and so on.

In some embodiments, the temperature sensors 162 may be placed within the thermostat 150 so that the temperature response from each of the sensors 162 may be generally different for a given airflow (e.g., direction and/or magnitude). Without being limited to this or any other theory, by arranging the sensors to provide sufficiently different temperature responses for a given airflow direction and/or magnitude, a more accurate temperature offset may be made (e.g., per the methods described herein) based on the temperature sensor measurements during operations, that may account for variations in the airflow direction and/magnitude. A number of factors may be considered in order to determine an arrangement of the temperature sensors 162 within thermostat 150 to achieve a sufficient difference in responses as described above. Some of these examples are discussed below in more detail; however, what follows may not be an exhaustive list of all of the parameters that may factor into selecting the ultimate positioning of the temperature sensors within the thermostat 150 in various embodiments.

First, in some embodiments, a thermal resistance to ambient conditions (e.g., the conditions within the indoor space 10) relative to a thermal resistance to heat generating components within the thermostat 150 for each potential sensor location may be considered. Specifically, if a temperature sensor 162 is disposed within a particular location within the thermostat 150, the sensor 162 may have a particular thermal resistance to the temperature within the indoor space 10 ("ambient thermal resistance"), and may have another thermal resistance to the heat generated by the other heat generating components within the thermostat 150 ("local heat thermal resistance") at that particular location. If the ambient thermal resistance is relatively high compared to the local heat thermal resistance for a given temperature sensor 162 (at a particular location within thermostat 150), a temperature measured or detected by the temperature sensor 162 may be more greatly effected by the heat generated by other components within the thermostat 150. Conversely, if the ambient thermal resistance is relatively low compared to the local heat thermal resistance for the given temperature sensor 162, the temperature measured or detected by the temperature sensor 162 may be less effected by the heat generated by other components within the thermostat 150.

Both the ambient thermal resistance as well as the local heat thermal resistance may be a function of the distance between the temperature sensor 162 and the heat generating components within thermostat 150. In addition, the effect that an airflow may have on a temperature sensor measurement or detection may be a function of the sensitivity of that temperature sensor to heat generated by other components within the thermostat (which as described above is effected by the ambient thermal resistance and local heat thermal resistance of the temperature sensor 162 at the given location). Further, a thermal resistance (e.g., such as an ambient thermal resistance, a local heat thermal resistance, etc.) may change or vary on different sides or directions from the temperature sensor 162. For instance, if a temperature sensor 162 at a given location has a relatively low ambient thermal resistance and/or local heat thermal resistances on a particular side, an airflow along or on that side may have a relatively greater impact to the temperature measurement or detection from the temperature sensor 162. Thus, by placing the temperature sensors 162 within thermostat 150 so that a different ambient thermal resistance versus local heat thermal resistance is achieved among the sensors, a varied temperature response may be achieved from the temperature sensors 162 for a given airflow.

Second, in some embodiments, when p lacing the temperature sensors 162 within the thermostat 150, consideration may be given the relative location of the air vents (or other ports, holes, inlets, etc.) of the housing of the thermostat 150. Generally speaking, if a temperature sensor 162 is in a path of air flowing in and through the thermostat 150 (which may be a function of the placement of the temperature sensor 162 relative to an opening in the thermostat housing that is to permit entrance of the air flow), then a temperature measured or determined by that temperature sensor 162 will be offset a greater amount than a temperature sensor 162 that is occluded (partially or wholly) from the path of the airflow. In addition, depending on a direction of airflow, different locations within a thermostat 150 may be more or less accessible to the airflow as a function of the placement of the various openings in the thermostat housing. Thus, when selecting locations for the temperature sensors 162 within thermostat 150, different selections may be made so as to place some sensors 162 in a direct path of airflow along given directions, while also ensuring that some temperature sensors 162 are occluded from these airflow paths. Accordingly, selectively exposing and occluding certain temperature sensors 162 from expected airflow paths within the thermostat 150, the temperature measurements or determinations from the temperature sensors 162 may be sufficiently different as previously described above.

Third, in some embodiments, different mounting methods may be chosen for the various temperature sensors 162 within the thermostat 150 so as to vary the temperature responses from the temperature sensors 162 for given air flows as previously described above. For instance, in some embodiments, one or more of the temperature sensors 162 may be mounted with the thermostat 150 via a so-called "through-hole mount," such that the sensor is generally projected outward from the corresponding mounting surface (e.g., such as a surface of a printed circuit board or PCB), and one or more of the temperature sensors 162 may be mounted within the thermostat 150 via a so-called "surface mount" whereby the temperature sensor 162 is directly soldered to the mounting surface (e.g., again, such as a surface of a PCB). Without being limited to this or any other theory, the temperature sensors 162 that are secured within the thermostat 150 via a through-hole mount may be more sensitive to airflow within the thermostat 150 than the temperature sensors 162 that are secured within the thermostat 150 via a surface mount (e.g., since more overall surface area of a through-hole mounted temperature sensor 162 is exposed to air flowing within the thermostat 150 during operations as compared to a surface mounted temperature sensor 162).

As previously noted above, during operations, heat that is generated by the other electronic components of thermostat 150 (e.g., display 152, processor 160, memory 156, etc.) may cause the temperatures measured or detected by temperature sensors 162 to be inconsistent with the air temperature in the majority of the indoor space. That is, the temperature of the air within and immediately surrounding thermostat 150 may be higher than the air within the rest of the indoor space. Compensation for internal heating (and not for the affects of airflow) may be referred to herein as a "static temperature offset," wherein the term "static" is used to refer to the presumed static state of the airflow in/around the thermostat 150 during determination of the static temperature offset.

For instance, a static temperature offset may be applied by offsetting a measured temperature (e.g., a temperature measured or detected by a primary temperature sensor within the thermostat 150) by a predetermined amount based on operation of the other heat-generating components within thermostat 150. In some embodiments, the static temperature offset may be a single, constant value when the thermostat 150 is operating at a steady-state condition. In some embodiments, the static temperature offset may vary based on different operating states of one or more of the heat generating components within the thermostat 150. For instance, the static temperature offset may change depending on whether the display is active or inactive or based on a brightness level of the display. The values for the static temperature offset (e.g., whether they are a single value or multiple values based on heat-generating component operations as previously described) may be experimentally determined and/or may be estimated or calculated based on various factors, system parameters, and/or measurements. In some embodiments, the static temperature offset may vary during a warm-up or start-up period for the thermostat 150—e.g., such as for a period of time following the initiation or re-initiation of electrical power to the thermostat 150. In some of these embodiments, the changing static temperature offset may account for the increase in temperature within the thermostat 150, as the thermostat 150 approaches steady state operation (e.g., at the conclusion of the warm-up or start-up period).

The inventors have determined that by applying a static offset to sensed temperature can still result in deviations between sensed temperature and actual temperature of the indoor space. Particularly, airflow that occurs across and/or around the thermostat 150 (e.g., as a result of operating the indoor fan) can drive convective heat transfer that further alters the temperature measured by the temperature sensors 162. By using more than one temperature sensor 162, strategically placed within the thermostat 150 as previously described above, the temperature may be configured to detect and compensate for the effects of airflow. An obstacle to compensating for airflow is that airflow may encounter the thermostat from a plurality of different directions and at a plurality of different velocities. For instance, airflow may be directed to and/or across the thermostat 150 from: a first or top direction 170, whereby the airflow is directed across the thermostat 150 from a top side 165 of the thermostat 150 to a bottom side 166 of the thermostat 150 as shown in FIG.

3; a second or bottom direction 171, whereby the airflow is directed across the thermostat 150 from the bottom side 166 to the top side 165 as shown in FIG. 3; a third or left direction 172 whereby the airflow is directed across the thermostat 150 from a left side 167 of the thermostat 150 to a right side 168 of the thermostat 150 as shown in FIG. 3; and a fourth or right direction 173 whereby the airflow is directed across the thermostat 150 from the right side 168 to the left side 167 as shown in FIG. 3. In addition, airflow may encounter thermostat 150 along a combination of two or more of the direction 170, 171, 172, 173.

As a result, processor 160 may derive and apply a temperature offset to the raw temperature value provided from temperature sensors 162 (or to a raw temperature of a selected one of the temperature sensors 162) so as to account for airflow occurring on and/or around the temperature sensors 162, and thereby produce a corrected temperature measurement (which may be used for operation of the HVAC system 100 more generally). In some embodiments, the temperature offset and therefore the corrected temperature measurement may account for both the heat generated by the internal components (i.e., the static temperature offset) of the thermostat 150 (e.g., display 152, processor 160, memory 156, etc.) as well as the direction and magnitude of the airflow on and/or across the thermostat 150 (e.g., such as airflow directions 170, 171, 172, 173, or a combination thereof). In other embodiments, the temperature offset and therefore the corrected temperature measurement may account for the direction and magnitude of the airflow on and/or across the thermostat 150, but not the static temperature offset (and thus the static temperature offset may be determined by other methods as previously described above). Accordingly, embodiments of methods are described below (e.g., method 200) that may be performed (e.g., partially or wholly) by processor 160 (and/or other processors or controllers communicatively coupled to and/or remote from processor 160) to apply an offset to the raw temperature values from temperature sensors 162 that accounts for airflow(s) (e.g., airflow direction and magnitude) encountering the temperature sensor(s) during operations.

Figure 4:
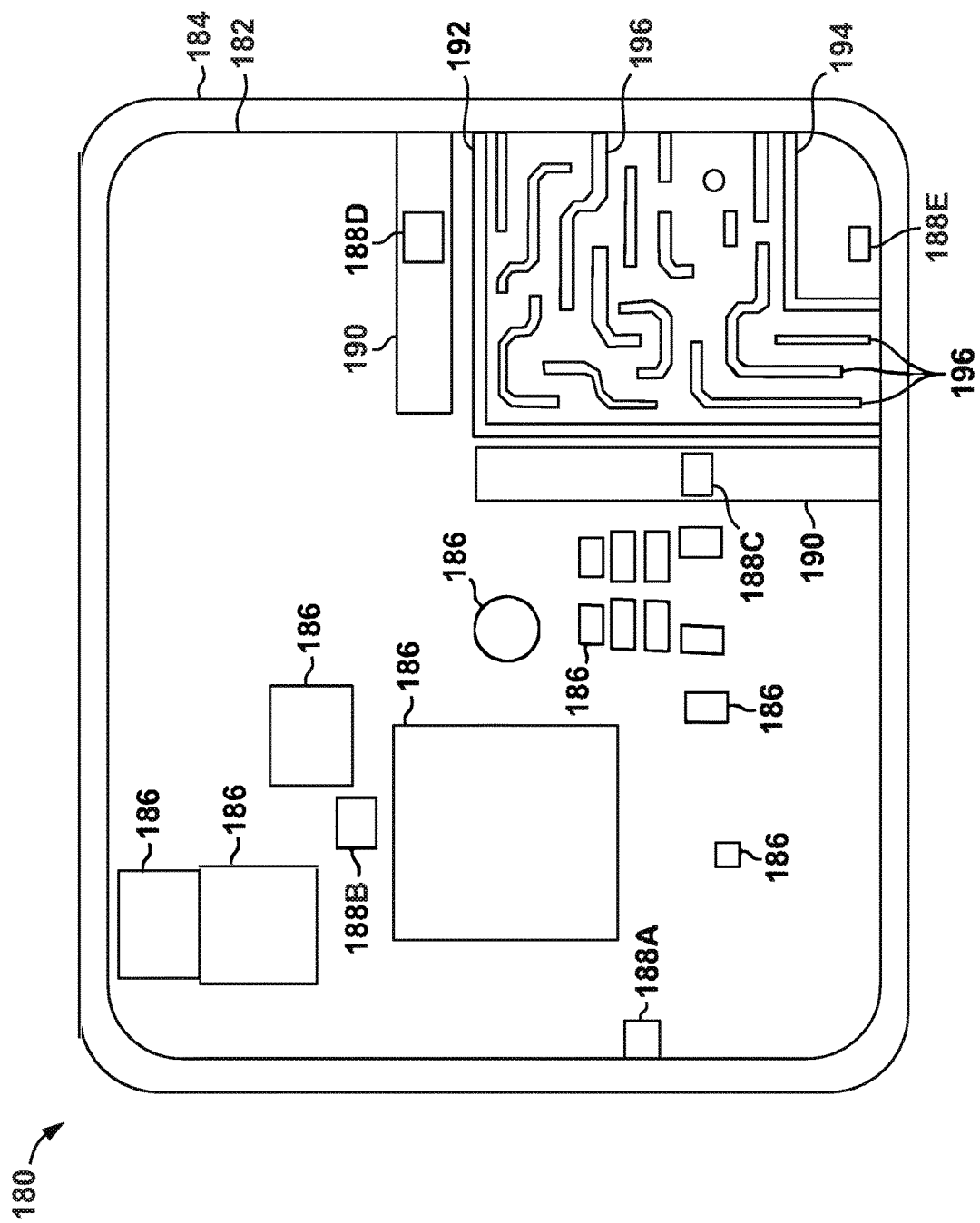
FIG. 4, is a top view of an example device of a climate control system according to some embodiments.

Referring now to FIG. 4, an example device 180 (e.g., thermostat, hub, controller, and/or any other device) of a climate control system (e.g., climate control system 100) is shown. In some embodiments, device 180 may be an embodiment of thermostat 150 shown in FIG. 3. Device 180 includes a circuit board (e.g., a printed circuit board or PCB) 182 that is disposed within a housing 184. Housing 184 may include an additional cover (not shown) that may cover or occlude the circuit board 182; however, the cover (not shown) of housing 184 is removed in FIG. 4 so as to show the internal features of device 180.

A number of electronic components 186 are mounted to circuit board 182. The electronic components 186 may comprise any one or more of the components of thermostat 150 (e.g., processor 160, memory 156, etc.), and/or other electronic components (e.g., resistors, capacitors, switches, amplifiers, etc.). During operations, one or more (or all) of the electronic components 186 may generate heat when energized with electric current as generally described above.

In addition, a plurality of temperature sensors 188A, 188B, 188C, 188D, 188E are mounted to circuit board 182. Temperature sensors 188A, 188B, 188C, 188D, 188E may be generally the same as the temperature sensors 162 previously described above (see e.g., FIG. 3). Thus, the same description above with respect to the temperature sensors 162 may be applied to describe the temperature sensors 188A, 188B, 188C, 188D, 188E. In addition, the temperature sensors 188A, 188B, 188C, 188D, 188E may be mounted and arranged along circuit board 182 so that the temperature response from each of the sensors 188A, 188B, 188C, 188D, 188E may be generally different for a given airflow (e.g., direction and/or magnitude) as previously described.

For instance, as a general matter, each of the temperature sensors 188A, 188B, 188C, 188D, 188E are mounted in different regions or quadrants of circuit board 182 and at different distances from adjacent electronic components 186. In addition, temperature sensors 188C, 188D may be mounted to circuit board 182 via enlarged (e.g., elongated) conductive surfaces 190 (e.g., electrically conductive, thermally conductive, etc.). Without being limited to this or any other theory, by mounting temperature sensors 188C, 188D to the circuit board 182 via conductive surfaces 190, the temperature sensors 188C, 188D may better approximate an average temperature of the circuit board 182 (or an environment immediately surrounding the circuit board 182) over relatively broad regions or areas (i.e., the regions or areas covered by the conductive surfaces 190).

Further, each of the temperature sensors 188A, 188B, 188C, 188D are mounted to circuit board 182 via a surface mount, while temperature sensor 188E is secured to circuit board 182 via a through-hole mount. Still further, temperature sensors 188C, 188D, 188E are mounted adjacent to internal walls 192, 194 extending normally to the surface or plane of circuit board 182. Without being limited to this or any other theory, the walls 192, 194 may be configured to block and/or direct airflows within the housing 184 during operations. Thus, the temperature sensors 188C, 188D, 188E may be selectively shielded from certain airflows via the walls 192, 194 during operations. In addition, by separating or walling off select temperature sensors (e.g., temperature sensor 188E via internal walls 192, 194), the temperature of the walled off space surround ng the temperature sensor may change toward ambient conditions more quickly since this temperature sensor is interacting with a relatively small volume of air.

A plurality of cut-outs or apertures 196 extend through the circuit board 182. In this embodiment, the apertures 196 are disposed between the walls 192, 194 and therefore, between the temperature sensors 188C, 188D and temperature sensor 188E. Without being limited to this or any other theory, the apertures 196 may help to increase a thermal resistance of one or more of the temperature sensors 188C, 188D, 188E by reducing a thermal heat transfer from electronic components along the circuit board 182 about and between the apertures 196 during operations. For example, because the apertures 196 are disposed between the temperature sensor 188E and the temperature sensors 188C, 188D and the electronic components 186, the apertures 196 may increase a thermal resistance between the temperature sensor 188E and the temperature sensors 188C, 188D and between the temperature sensor 188E and the electronic components 186. In addition, the apertures 196 may also allow airflow through the circuit board 182 and thus may further affect airflow patterns across one or more of the sensors 188A, 188B, 188C, 188D, 188E during operations.

Figure 5:
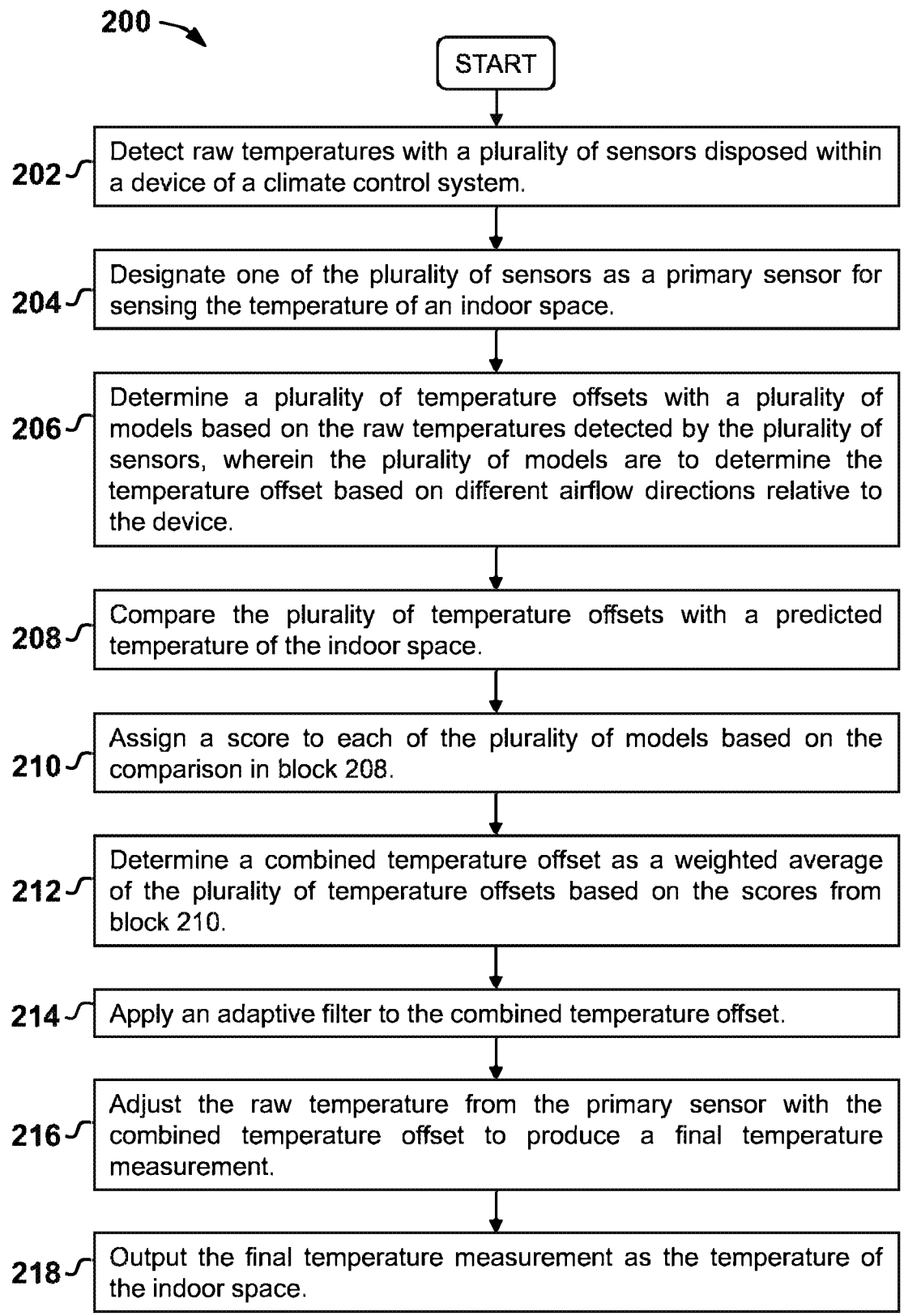
FIG. 5 is a flow chart of a method of correcting a temperature reading from an onboard sensor of a device of a climate control system according to some embodiments.

Referring now to FIG. 5, a method 200 of correcting a temperature measurement from sensors within a device of a climate control system is shown. In some embodiments, method 200 may be practiced with thermostat 150 and HVAC system 100 (see e.g., FIGS. 1 and 3). Specifically, in some embodiments, method 200 may be performed (at least partially) by processor 160 of thermostat 150. In some embodiments, method 200 may be performed (at least partially) by other components of HVAC system 100 shown in FIG. 1, such as, for instance, controllers 106, 124, 126, I/O unit 107, or a combination thereof. In some embodiments, method 200 may be performed (at least partially) by a remote device (e.g., server, computer, tablet, laptop, smartphone, etc.). However, it should be appreciated that embodiments of method 200 may be practiced with other systems, assemblies, and devices other than those specifically described above.

Generally speaking, and without being limited to this or any other theory, the magnitude as well as the direction of airflow across a device may directly affect temperature measurements taken by sensor(s) disposed within the device. Thus, airflow along different directions relative to the device may produce different variations in the temperature measurements from one or a plurality of sensors disposed within the device. Method 200, described in more detail below, provides a process whereby different models relating to different airflow directions (as well as different airflow velocities along the different airflow directions) relative to the device are utilized to compute different corrections for the temperatures measured by onboard sensors per unit time. Each of these computed temperature corrections is then summed based on a normalized score that is determined based on the predictive thermal behavior of the indoor space in order to provide a combined temperature correction that takes into account the direction and magnitude of the airflows flowing in and around the device during operations. As a result, method 200 provides a process whereby a more accurate temperature correction may be applied to the raw temperature measurements from the one or more sensors disposed within the device so that control operations relating to the climate control system may be more accurate. The specific processes and steps relating to method 200 are now described more detail below.

Initially, method 200 includes detecting raw temperatures with a plurality of sensors disposed within a device of a climate control system at 202. Generally speaking, the device (e.g., the thermostat 150 in FIG. 3) may include a plurality (e.g., 2, 3, 4, 5, or more) of temperature sensors (e.g., temperature sensors 162, 188A, 188B, 188C, 188D, 188E, etc.) disposed therein. Thus, at block 202, each of these temperature sensors may detect a temperature within the device, which may include or be indicative of the temperature of the space immediately surrounding the device (e.g., the indoor space 10 that is being conditioned by the climate control system). In some embodiments, the temperature sensors may each detect a plurality of temperatures over a period of time. Specifically, in some embodiments each temperature sensor within the device may detect a temperature at regular intervals of time, such as, for instance, after every predetermined number of second(s), minute(s), hour(s), etc.

Next, method 200 includes designating one of the plurality of sensors as a primary sensor for sensing the temperature of an indoor space at 204. As previously described above, the indoor space (e.g., indoor space 10) may comprise the space that is being conditioned (e.g., heated, cooled, etc.) by the climate control system (e.g., HVAC system 100). Any of the plurality of sensors may be selected to act as the primary sensor for sensing the temperature of the indoor space at 204. In some embodiments, a sensor of the plurality of sensors may be selected as the primary sensor based on that particular sensor's position within the device. In some embodiments, the selection of the primary sensor may be specific to the design of the device itself and may occur during the manufacture or design of the device.

In some embodiments, a sensor of the plurality of sensors may be selected as the primary sensor based on that particular sensor's resistance (e.g., thermal resistance) to airflow during operations. More specifically, a sensor (e.g., of the plurality of sensor) may be selected as the primary sensor if it is less sensitive (i.e., the measured or detected temperature is less affected) by airflow across/along the sensor during operations. In some embodiments, the primary sensor may be the sensor with the least sensitivity to airflow as compared to the other sensors of the plurality of sensors. Without being limited to this or any other theory, by selecting the primary sensor based on its sensitivity to airflow, a magnitude of a correction (e.g., a dynamic offset) may be reduced so as to generally increase the accuracy of temperature measurements or determinations during operations.

Method 200 also includes determining a plurality of temperature offsets utilizing a plurality of models based on the raw temperatures detected by the plurality of sensors at 206. The plurality of models may determine the plurality of temperature offsets for the temperature detected by the primary sensor designated at block 204. Each of the plurality of models may comprise a mathematical relationship (e.g., including one or a plurality of functions in some embodiments) that provides a temperature offset or correction based on airflow in a particular direction relative to the device (e.g., such as, for instance, airflow along one of the directions 170, 171, 172, 173 in FIG. 3). In some embodiments, the temperature offsets or corrections provided by the plurality of models may also account (e.g., indirectly) for heat generated by other components disposed within the device (e.g., such as display 152, processor 160, memory 156, etc. of thermostat 150).

Referring briefly to FIGS. 3 and 5, in some embodiments a first of the plurality of models from block 206 may comprise a model for determining the temperature offset when the airflow is directed along direction 170, a second of the plurality of models from block 206 may comprise a model for determining the temperature offset when the airflow is directed along direction 171, a third of the plurality of models from block 206 may comprise a model for determining the temperature off set when the airflow is directed along direction 172, and a fourth of the plurality of models from block 206 may comprise a model for determining the temperature offset when the airflow is directed along direction 173.

In some embodiments, the plurality of models may provide a temperature offset based on or as a function of the difference between the temperatures of the plurality of temperature sensors and the primary sensor as well as the derivative (e.g., such as the first order derivative) of these temperature differences. As a specific example, a device (e.g., thermostat 150) may comprise three onboard temperature sensors $S_1$, $S_2$, $S_3$. Each of the temperature sensors $S_1$, $S_2$, $S_3$ may detect temperatures $T_1$, $T_2$, $T_3$, respectively, at regular time intervals. Temperature sensor $S_1$ may be designated as the primary sensor as noted above in block 204. Thus, during operations, at block 206 of method 200, a plurality of models may provide a plurality of temperature offsets for the temperature $T_1$ detected by the primary sensor $S_1$ based on the difference between the temperatures $T_2$, $T_3$ detected by the sensors $S_2$, $S_3$, respectively, and the temperature $T_1$ detected by the primary sensor $S_1$ (i.e., $(T_2-T_1)$ and $(T_3-T_1)$), as well as the derivative (e.g., first order derivative) of these differences with respect to time (t) (i.e., $$\frac{d(T_2 - T_1)}{dt}$$

and $$\frac{d(T_3 - T_1)}{dt}$$

As will be described in more detail below, the plurality of models may be derived via a regression analysis using labeled or known data for airflow along particular directions for various magnitudes. In some embodiments, the plurality of models may output a predicted temperature of the indoor space based on the difference between the temperature detected by the plurality of sensors and the derivative thereof as previously described above. Thus, in these embodiments, the temperature offsets for the temperature detected by the primary sensor determined by the plurality of models may be the difference (or absolute value thereof) between the predicted temperature produced by the plurality of models and the temperature detected by the primary sensor.

Next, method 200 includes comparing the plurality of temperature offsets (e.g., calculated utilizing the plurality of models at block 206) with a predicted temperature of the indoor space at 208. In some embodiments, a predicted temperature and/or temperature profile (e.g., temperature vs. time) may be determined based on a variety of factors relating to the climate control system (e.g., HVAC system 100) such as, for instance, the current operational mode of the climate control system (e.g., heating mode, cooling mode, etc.), the current outdoor temperature, the previously determined and/or corrected indoor temperature, as well as the operational parameters of the climate control system (e.g., the speed of the compressor 116, the speed of the indoor fan 110 and/or the outdoor fan 118, the temperature of the indoor heat exchanger 108 or a coil thereof, etc.). In some embodiments, the predicted temperature or temperature profile may be determined based on any one or more of the previously listed factors in combination with an assumed rate of temperature change within the indoor space based on the operation of the climate control system.

In some embodiments, the comparison at 208 may comprise deter mining a difference (e.g., an absolute value of the difference) between the predicted temperature and a determined temperature the indoor space based on the temperature correction determined by each of the plurality of models. Thus, if a predicted temperature at a given time is 70° F., a first determined temperature of the indoor space based on the temperature correction determined by a first of the models is 72° F., and a second determined temperature of the indoor space based on the temperature correction determined by a second of the models is 75° F., then the comparison at 208 may comprise determining that a first difference between the predicted temperature and the first determined temperature from the first model is 2° F., and determining that a second difference between the predicted temperature and the second determined temperature from the second model is 5° F.

Next, method 200 includes assigning a score at block 210 to each of the plurality of models from block 206 based on the comparison between the plurality of temperature offsets and the predicted temperature from block 208. In some embodiments, models that produce a relatively low temperature difference between the model-determined temperature and the predicted temperature from block 208 may receive a relatively higher score than models that produce a relatively high temperature difference between the model temperature and the predicted temperature from block 208. Thus, in the example above, the first model (which showed a 2° F. difference with the predicted temperature) may receive a higher score than the second model (which showed a 5° F. difference with the predicted temperature). In some embodiments, the scores assigned at block 210 may comprise a magnitude or percentage of the difference between the predicted temperature and the determined temperature utilizing each of the plurality of models as discussed above for block 208. In some embodiments, the score assigned at block 210 may comprise a value between 0 and 1, with the models that provided a model-determined temperature with a relatively low difference to the predicted temperature receiving correspondingly higher scores (e.g., scores that are relatively closer to 1 than 0), and with models that provided a model-determined temperature with a relatively high difference to the predicted temperature receiving corresponding lower scores (e.g., scores that are relatively closer to 0 than 1).

In some embodiments, the scores assigned to each of the plurality of models may not be a value between 0 and 1. In some of these embodiments, the scores may first be normalized so as to produce a weighting factor that is a value between 0 and 1 after block 210 and before bock 212. Any suitable normalization function may be utilized to accomplish the normalization of the scores in these embodiments (e.g., such as dividing the squared value of each score by the squared summation of all of the assigned scores from block 210).

Without being limited to this or any other theory, if a difference between a temperature determined by one of the models and the predicted temperature is relatively low, it indicates that the model that produced the determined temperature is relatively more accurate for determining the current temperature offset for the primary temperature sensor at that time. Thus, by scoring the models based on the differences between the model-determined temperatures and the predicted temperature as previously described above, the models that are providing a relatively more accurate representation of the current temperature offset are identified and weighted accordingly.

Next, at block 212, method 200 includes determining a combined temperature offset as a weighted average of the plurality of offsets determined by the plurality of models based on the scores determined at block 210. For instance, the temperature offset from each of the plurality of models may be multiplied by its corresponding score (e.g., a value between 0 and 1 or a normalized version of the scores representing a value between 0 and 1) and summed with the temperature offsets calculated by the other models (which are also multiplied by their corresponding scores from block 210) to produce a weighted average of the models. This weighted average is then utilized as the combined temperature offset.

In some embodiments, method 200 may include, at block 214, applying an adaptive filter to the combined temperature offset after block 212. Without being limited to this or any other theory, one may wish to avoid overly correcting the raw temperature reading from the primary sensor as a result of noise occurring within the temperature sensors during operations. However, it may be desirable to capture relatively large temperature changes due to sudden changes in airflow relative to the device. Thus, at block 214, an adaptive filter is applied to the combined temperature offset from block 212 that is to filter out noise related fluctuations of the temperature sensors while still allowing for temperature offset changes resulting from transient airflow conditions within the indoor space. In some embodiments, the adaptive filter may allow or filter out larger or smaller changes to the combined temperature offset (e.g., changes based on the previously determined combined temperature offset) based on the amount that the temperature from the primary temperature sensor is changing overtime.

In some embodiments, the adaptive filter applied at block 212 may comprise one filter or a plurality of filters operating together during operations. For example, in some embodiments, the adaptive filter may comprise a rate saturation filter for the combined temperature offset. Generally speaking, a rate saturation filter may limit a change in a given value (e.g., the temperature offset) between two consecutive samples or determinations. Thus, in some embodiments, the rate saturation filter (which may comprise at least a portion of the adaptive filter as previously described) may be applied to limit a change in the combined temperature offset from block 212 from a previously determined combined temperature offset during a previous performance of block 212. Specifically, a difference between the currently determined combined temperature offset and the last determined combined temperature offset (during the previous performance of block 212) may be determined and compared with a saturation limit. If the difference between the current and previous combined temperature offsets is less or equal to than the saturation limit, the currently computed combined temperature offset is accepted. If, on the other hand, the difference between the current and previous combined temperature offsets is more than the saturation limit, the currently computed combined temperature offset is rejected, and the new combined temperature offset is simply taken as the previously determined combined temperature offset, plus the saturation limit.

The saturation limit may be a pre-selected value (e.g., that estimates or establishes a maximum rate of change for the combined temperature offset), or may be a dynamic value that is dependent upon other parameters, measurements, etc. For instance, in some embodiments, the saturation limit may be equal to (or at least based on) the change in raw temperature detected by the primary sensor (e.g., the primary sensor selected at block 204) between the current and previous performance of block 202. Thus, if the primary sensor measures a 0.5° F. change in the detected temperature between the last and the current performances of block 202, the saturation limit for the rate saturation filter may be set at 0.5° F. Without being limited to this or any other theory, by setting the saturation limit of the rate saturation filter to be equal to the most recent observed change in temperature determined or measured by the primary sensor, the noise introduced by the calculation of the combined temperature offset may be less than the noise introduced by the primary sensor itself.

In some embodiments, the saturation limit may not be simply equal to the most recent temperature change determined by the primary sensor. Rather, in some embodiments, a fraction or portion of this change may be determined as the saturation limit for the rate saturation filter described above. For instance, in some embodiment, the temperature change noted by the primary senor may be multiplied by a rate gain to produce the final saturation limit. The rate gain may be a value that is between 0 and 1 such as, for example, 0.5, 0.25, etc. Thus, when the rate gain is included in the expression, the saturation limit may be some fraction of the latest observed temperature change of the primary sensor.

In some embodiments, the rate saturation filter may be limited or modified based on a magnitude of the current proposed filtering for the combined temperature offset. More particularly and without being limited to this or any other theory, if an observed change in the combined temperature offset is significantly larger than the saturation limit (e.g., which may be equal to or a function of the last consecutive temperature change observed by the primary sensor as previously described), then it may be assumed that the filter is not primarily filtering noise, but is instead filtering out an actual transient change in the airflow conditions being experienced by the device of the climate control system. Thus, in some embodiments, the rate saturation filter may be effectively slowed so as to allow the change (or a part of the change) in the combined temperature offset to be applied to the current primary sensor measurement.

Specifically, in some embodiments, the initially proposed saturation limit (e.g., which may be determined via one or more of the method described above) may be additionally multiplied by an error (or difference) between the raw combined temperature offset and the proposed filtered combined temperature offset (which may be the raw combined temperature offset filtered by the rate saturation filter utilizing the proposed saturation limit as described above). Therefore, as the difference between the filtered and raw combined temperature offsets increases, the final saturation limit that is applied within the rate saturation filter also increases-which thereby slows or lessens the filtering that is applied. As a result, the rate saturation filter may be adaptable so as to accept large changes in the combined temperature offset caused by transient airflow conditions while rejecting or filtering out at least some of the changes to the combined temperature offset caused by sensor or calculation noise.

In some embodiments, the adaptive filter applied at block 214 may also comprise a first order infinite impulse response (IIR) filter to further filter the combined temperature offset values. The IIR filter may include a time constant term (t) that may determine how aggressive the IIR filter is during operations. Specifically, as the value of t increases, the resulting changes in the combined temperature offsets become smoother over time. For instance, in some embodiments, the IIR filter may apply the following algorithm as a function of t:

$$FO_n = FO_{n-1}\left(1 - \frac{1}{t}\right) + RO_n\left(\frac{1}{t}\right), \quad (1)$$

wherein $FO_n$ refers to the filtered temperature offset for the current computation, $FO_{n-1}$ refers to the filtered temperature offset for the previous computation, and $RO_n$ refers to the currently computed, unfiltered temperature offset.

Generally speaking, the value of t in the expression above (e.g., equation 1) may be a function of the observed changes in the primary sensor temperature over time as well as the difference between the raw combined temperature offset and the proposed filtered combined temperature offset (e.g., the combined temperature offset as filtered by the rate saturation filter via the proposed saturation limit as previously described above). Therefore, in some embodiments, the value of t for the IIR filter may be a function of the final saturation limit to be utilized within the rate saturation filter as previously described. In particular, the value of t may be equal to a gain value (which may be a pre-selected value)

divided by the absolute value of the final saturation limit applied by the rate saturation filter. In addition, the value of t may be further limited to a defined range (e.g., between a predetermined lower limit and a predetermined upper limit) so as to prevent the value of t from moving out of a predetermined range of values. For instance, in some embodiments, the value of t may be limited to between 1 and 3600.

Finally, the method 200 proceeds to adjust the raw temperature from the primary temperature sensor with the combined temperature offset to produce a final temperature measurement at 216. In some embodiments, the combined temperature offset may be filtered utilizing an adaptive filter as described above for block 214. In some embodiments, adjusting the raw temperature from the primary sensor with the combined temperature offset may comprise adding or subtracting the combined temperature offset from the raw temperature measured by the primary sensor. The final temperature measurement produced at block 216 by the adjustment may then be output at block 218 as the temperature measurement of the indoor space (e.g., indoor space 10).

Referring again to FIGS. 3 and 5, in some embodiments, processor 160 of thermostat 150 may perform method 200 during an operational cycle of the climate control system (e.g., HVAC system 100). In particular, an operational cycle of HVAC system 100 may comprise the period of time that the compressor 116, indoor fan 110, and/or outdoor fan 118 are operating to condition (e.g., heat, cool, etc.) the air within the indoor space 10. Thus, during an operational cycle for the HVAC system 100, the processor 160 may perform the method 200 repeatedly so as to produce a continuously updated combined temperature offset and final temperature measurement of the indoor space at regular time intervals (e.g., every one or more second, minutes, hours, etc.). In some embodiments, the processor 160 may continuously perform the method 200 until the earlier of the end of the operational cycle or a set time limit, such as, for instance, 20 minutes, 30 minutes, 45 minutes, 1 hour, etc. Upon the initiation of a new operational cycle with HVAC system 100, the processor 160 may initially apply a combined temperature correction based on the last determined relative scoring (e.g., see e.g., block 210 in FIG. 4) between the plurality of models at the last iteration of the method 200 during the previous operational cycle with HVAC system 100. Thereafter, the processor 160 may once again perform the method 200 to update the temperature correction based on current measurements from the plurality of temperature sensors 162.

Without being limited to this or any other theory, by repeatedly performing method 200, the combined temperature offset may be continuously updated so as to account for possible changes in the airflow regime (e.g., direction and/or speed) within the indoor space about the device (e.g., thermostat 150). Thus, a changes within the indoor space that may alter the air flow regime, such as, turning a ceiling fan on or off, opening or closing doors, increasing or decreasing occupancy, etc. may all be accounted for so as to ensure a continued accuracy of the corrected temperature measurements of the primary temperature sensor.

In some embodiments, method 200 may include comparing a raw temperature measurement from the primary sensor with the temperature offsets determined by the plurality of models. If the plurality of temperature offsets are relatively small (e.g., below a predetermined threshold) so that the temperature of the primary sensor corrected or adjusted by the plurality of temperature offsets would be relatively close to or substantially the same as the raw temperature measured by the primary sensor, then the scores of the plurality of models are not determined at block 210 (or updated in subsequent iterations of method 200). In some embodiments, if the raw temperature detected by the primary sensor is close to the corrected temperatures by the plurality of models (i.e., raw temperature detected by the primary sensor adjusted by the plurality of offsets determined by the plurality of models), no offset may be applied or a set or predetermined offset may be applied to the raw temperature detected by the primary sensor (e.g., an offset based primarily on the steady-state heat generated by the heat-generating components disposed within the device).

In some embodiments, an additional temperature offset may be determined at block 206 as a difference between the raw temperature of the primary sensor and the predicted temperature of the indoor space from block 208. In some of these embodiments, this additional temperature offset is assigned a score in block 210 and the combined temperature offset determined at block 212 may include this additional offset in the computation previously described above.

Figure 6:
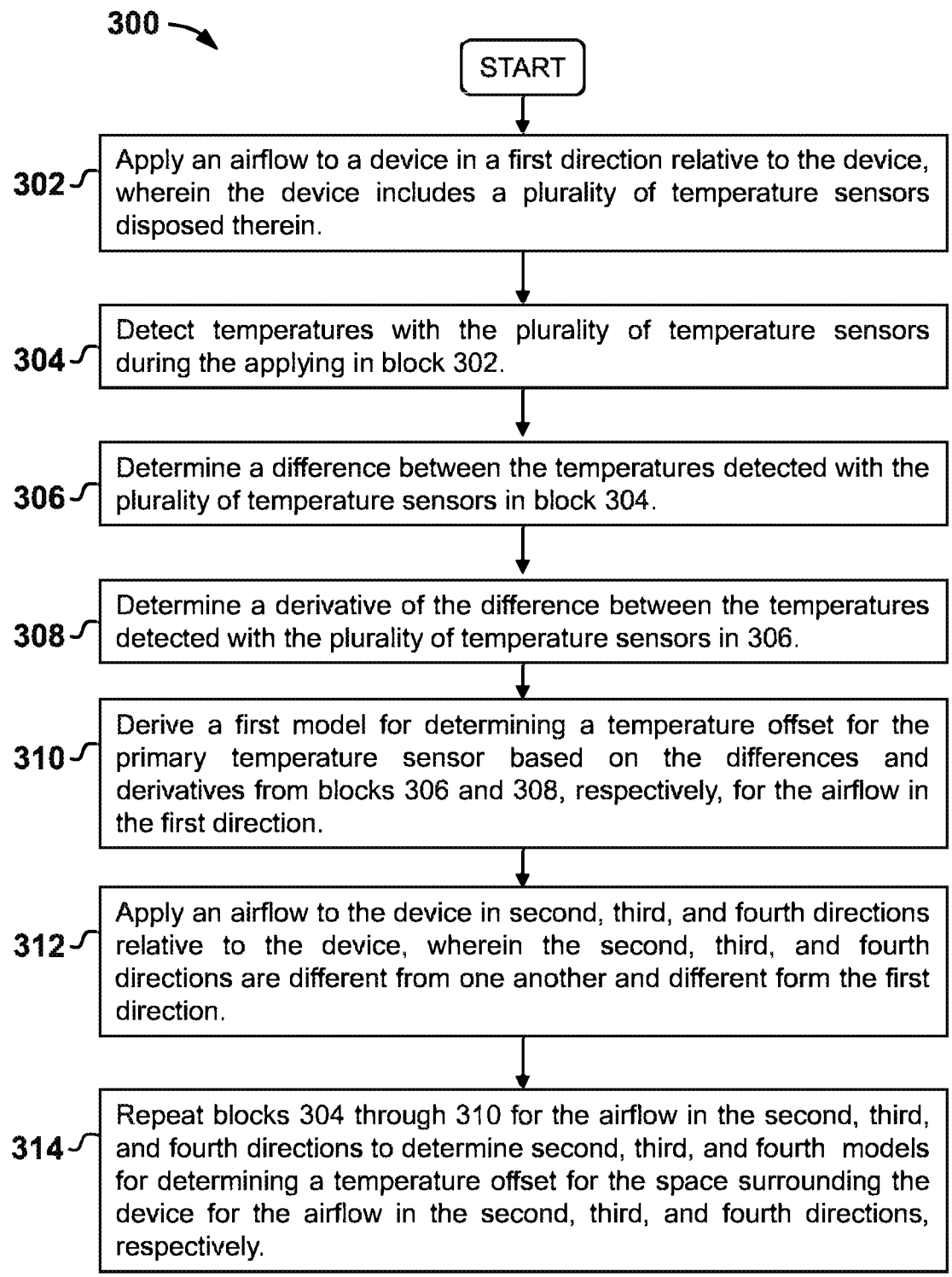
FIG. 6 is a flow chart of a method of deriving a plurality of models for determining a temperature offset for a temperature sensor within a device o f a climate control system based on a direction of airflow relative to the device according to some embodiments.

Referring now to FIG. 6, a method 300 of generating a plurality of models for determining a temperature offset for temperature readings from a plurality of temperature sensors within a device of a climate control system (e.g., HVAC system 100) is shown. In some embodiments, the method 300 may be performed to generate the plurality of models utilized within the method 200 shown in FIG. 5 and described above (e.g., such as the plurality of models discussed at block 206 of method 200 in FIG. 5).

Initially, method 300 includes applying an airflow to a device in a first direction relative to the device, wherein the device includes a plurality of temperature sensors disposed therein at block 302. In some embodiments, the device may comprise a thermostat such as thermostat 150 shown in FIG. 3 (which includes a plurality of temperature sensors 162 as previously described). Thus, applying the airflow in the first direction at block 302 may comprise applying the airflow in one of the directions 170, 171, 172, 173 shown in FIG. 3. In some embodiments, applying the airflow in the first direction at block 302 may comprise applying the airflow in the first direction at a plurality of different air speeds (e.g., such as at regular intervals within a predetermined range of air speeds). In addition, in some embodiments, applying the airflow in the first direction at block 302 may occur within a wind tunnel or other controlled environment.

Next, method 300 includes detecting temperatures with the plurality of temperature sensors at block 304 during the applying of the airflow to the device at block 302. In some embodiments, the temperatures may be repeatedly taken from each sensor of the plurality of temperature sensors at regular time-based intervals (e.g., such as every one or more seconds, minutes, hours, etc. or at time intervals that are less than a second). The temperature sensors may comprise any suitable device or assembly of devices for measuring temperature (or some proxy thereof), such as, for instance any of the example devices mentioned above for temperature sensors 162 in thermostat 150 of FIG. 3.

Once the temperature is detected at block 304, method 300 proceeds to determine the difference between the temperatures detected with the plurality of sensors at block 306. In some embodiments, the difference is computed at block 306 by designating one of the plurality of temperature sensors as the primary temperature sensor an d then taking the difference between the temperature(s) detected by the primary temperature sensor an d the temperature(s) detected by each of the other temperature sensors of the plurality of temperature sensors. The difference may be computed for all detected temperatures at each unit or interval of time (e.g., such as in embodiments where multiple temperatures are detected by the plurality of temperature sensors over regular intervals of time as previously described above). Next, method 300 includes determining the derivative of the difference between the temperatures determined at block 306 at block 308. In some embodiments, block 306 may include determining the first order derivative of the differences in the temperatures determined at block 304. In some embodiments, determining the differences and derivatives for the temperature detected by the plurality of sensors at blocks 306 and 308 may be similar to that described above for the differences and derivatives consider ed within the plurality of models in block 208 of method 200.

Once the temperature differences and derivatives are determined via block 306 and 308, respectively, as previously described above, method 300 proceeds to derive a first model for determining a temperature offset for the primary temperature sensor based on the differences and derivatives for the airflow in the first direction at block 310. In particular, for each unit time that the temperature is detected by the plurality of temperature sensor s at block 304, a environment temperature is measured by a temperature sensor disposed outside of the device. Thus, the actual temperature of the environment surrounding the device is known and separately measured at each unit time that temperature is simultaneously detected by the plurality of temperature sensors within the device at block 304. As a result, a temperature difference or offset between the temperatures measured by the designated prima y temperature sensor and the environment may be determined. Thus, the first model may be derived by relating the known temperature difference or offset to the temperature differences and derivatives for each unit time, so that the first model is a function (or collection of functions) that produce the temperature offset for the primary temperature sensor for a known or given set of differences and derivatives for the temperature measurements for the plurality of temperature sensors within the device. The first model may be derived via any suitable method, such as linear regression, and may comprise a linear function (or set of linear functions). As a result, the first model may produce the temperature offset of the primary temperature sensor (e.g., the temperature difference between the measurement of the primary temperature sensor and the actual temperature of the environment surrounding the device) for when the airflow is in the first direction, as a function of the temperature differences between the primary temperature sensor and the rest of the plurality of temperature sensors and the first derivative of the temperature differences. In addition, in some embodiments, the device (e.g., thermostat 150 in FIG. 3) may be operated (e.g., energized with electric current) during the applying of the airflow at block 302 and the detection of temperature at block 304 so that the first model derived at block 310 may also account for heat generated within the device (e.g., heat generated by heat generating components within the device such as, for instance display 152, processor 160, memory 156, etc. within thermostat 150 in FIG. 3) that may further skew the temperatures detected by the plurality of sensors within the device as previously described above.

Once the first model for determining the temperature offset for the primary temperature sensor within the device for the airflow in the first direction is derived at block 310, method 300 proceeds to apply airflow to the device in second, third, and fourth directions at block 312. The airflow in the second, third, and fourth directions may all be different from the first. For instance, in some embodiments, the airflow in the first direction may correspond with the airflow direction 170 in FIG. 3 for the thermostat 150, and the airflow in the second, third, and fourth directions may correspond with the airflow directions 171, 172, 173, respectively, in FIG. 3. While the airflow is being applied to the device in the second, third, and fourth directions, method 300 also repeats blocks 304-310 for the airflow in each of the second, third, and fourth directions, so as to produce second, third, and fourth models for determining the temperature offset of the primary temperature sensor for when the airflow is in the second, third, and fourth models, respectively (e.g., at block 314). Thus, the second, third, and fourth models may be essentially the same (and therefore may be derived in substantially the same manner) as the first model. Accordingly, following the completion of block 314 of method 300, four models (e.g., first, second, third, and fourth models) are derived for determining the temperature offset for the primary temperature sensor when airflow is directed in various different directions (e.g., first, second, third, and fourth directions, respectively). These models may then be utilized to determine airflow and overall temperature offset in the manner previously described above (see e.g., method 200 in FIG. 5). As was previously described for the first model, when applying the airflow in the second, third, fourth directions at block 312, the device may be operated (e.g., energized with electric current) so that the second, third, and fourth models, respectively, may account for the heat generated within the device (e.g., heat generated by heat generating components within the device such as, for instance display 152, processor 160, memory 156, etc. within thermostat 150 in FIG. 3) in the same manner as described above for the first model.

Embodiments disclosed herein include systems and methods for correcting the temperature measured by an onboard sensor of a thermostat or other suitable device associated with a climate control system so as to help ensure efficient and desired operation of the climate control system. In particular, the embodiments disclosed herein may provide a corrected temperature based for the onboard sensor of a thermostat by accounting for both the heat generated by the internal components of the thermostat as well as the airflow direction and magnitude relative to the device during operations. Thus, through use of the embodiments disclosed herein, a climate control system may be controlled and operated based on more accurate estimations of temperature for the conditioned, indoor space.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of controlling a climate control system that includes HVAC equipment configured to provide conditioned air to a conditioned space, the HVAC equipment including a fan, a controller, and a processor, the processor being coupled to the fan and the controller, and the controller including a housing and a plurality of onboard sensors for determining a temperature of an indoor space of the climate control system, wherein each of the plurality of sensors is arranged and mounted at a different location within the housing, each of the different locations being selected while considering one or more of: a distance of each of the sensors relative to one or more heat generating components within the housing, a distance of each of the sensors relative to one or more air vents and a direction and magnitude of the airflow within the housing through the air vents, and a desired amount of exposed surface area of each of the sensors, the method comprising:
- detecting raw temperatures with the plurality of sensors coupled to the processor, the plurality of sensors being arranged and mounted at different locations within the controller so that, in response to the airflow within the controller, varied temperature responses are detected among the plurality of sensors;
- determining, via the processor, a first adjusted temperature based on a first detected raw temperature from a first sensor of the plurality of sensors and a plurality of models;
- determining, via the processor, a second adjusted temperature based on a second detected raw temperature from a second sensor of the plurality of sensors and the plurality of models,
- filtering, via the processor, the first adjusted temperature and the second adjusted temperature based on a difference between the first detected raw temperature and the second detected raw temperature to determine a selected adjusted temperature;
- controlling the fan, via the processor, to provide conditioned air based on the selected adjusted temperature; and
- presenting the selected adjusted temperature on a display, wherein determining the first adjusted temperature includes determining a first combined temperature offset as a first weighted average of a first set of outputs of the plurality of models based on comparing the first set of outputs of the plurality of models to a first predicted temperature of the indoor space, and
- wherein determining the second adjusted temperature includes determining a second combined temperature offset as a second weighted average of a second set of outputs of the plurality of models based on comparing the second set of outputs of the plurality of models to a second predicted temperature of the indoor space.

2. The method of claim 1, wherein the first sensor and the second sensor are the same sensor.

3. The method of claim 1, wherein the processor is located external from the controller.

4. The method of claim 1, wherein the controller is a thermostat.

5. The method of claim 1, wherein the plurality of models are configured to determine a first plurality of temperature offsets for the first sensor based on the different airflow directions relative to the device and accounting for heat generated by the heat generating components in the thermostat; and
- wherein the plurality of models are configured to determine a second plurality of temperature offsets for the second sensor based on the different airflow directions relative to the device and accounting for heat generated by the heat generating components in the thermostat.

6. The method of claim 1, wherein determining the first weighted average further includes determining a first score for each of the outputs of the first set of outputs of the plurality of models that is indicative of the difference between the outputs and the first predicted temperature, and applying a first weight to each of the plurality of models based on the first score to determine the first weighted average; and
- determining the second weighted average further includes determining a second score for each of the outputs of the second set of output of the plurality of models that is indicative of the difference between the outputs and the second predicted temperature, and applying a second weight to each of the plurality of models based on the second score to determine the second weighted average.

7. The method of claim 1, wherein filtering the first and second adjusted temperatures includes using a rate saturation filter, the rate saturation filter comprising a saturation limit that is based on the difference between the first raw temperature detected and the second raw temperature detected.

8. The method of claim 1, wherein each of the plurality of models are configured to provide a temperature offset for the first and second temperature sensors based on differences between temperatures detected by the plurality of onboard sensors, as a result of the arrangement and mount of the plurality of sensors at the different locations within the thermostat, and the temperature detected by the sensor, and a derivative of the differences between the temperatures detected by the plurality of onboard sensors.

9. A controller for controlling a climate control system, the controller comprising:
- a housing;
- a plurality of temperature sensors arranged and mounted at different locations within the housing so that, in response to an airflow within the housing, varied temperature responses are detected among the plurality of sensors, wherein each of the plurality of sensors is arranged and mounted at the different location within the housing, each of the different locations being selected while considering one or more of: a distance of each of the sensors relative to one or more heat generating components within the housing, a distance of each of the sensors relative to one or more air vents and a direction and magnitude of the airflow within the housing through the air vents, and a desired amount of exposed surface area of each of the sensors; and
- a processor operatively coupled to the plurality of temperature sensors and HVAC equipment including a fan, wherein the processor is configured to:
  - detect raw temperatures with the plurality of sensors coupled to the processor;
  - determine a first adjusted temperature based on a first detected raw temperature from a first sensor of the plurality of sensors and a plurality of models;
  - determine a second adjusted temperature based on a second detected raw temperature from a second sensor of the plurality of sensors and the plurality of models,
  - filter the first adjusted temperature and the second adjusted temperature based on a difference between the first detected raw temperature and the second detected raw temperature to determine a selected adjusted temperature; and
  - present the selected adjusted temperature on a display, wherein determining the first adjusted temperature includes, at least in part, determining a first combined temperature offset as a first weighted average of a first set of outputs of the plurality of models based on comparing the first set of outputs of the plurality of models to a first predicted temperature of the indoor space, and wherein determining the second adjusted temperature includes, at least in part, determining a second combined temperature offset as a second weighted average of a second set of outputs of the plurality of models based on comparing the second set of outputs of the plurality of models to a second predicted temperature of the indoor space.

10. The controller of claim 9, wherein the first sensor and the second sensor are the same sensor.

11. The controller of claim 9, wherein the housing includes a first housing and a second housing, the second housing located a distance away from the first housing, wherein the plurality of temperature sensors are arranged and mounted within the first housing, and wherein the processor is located within the second housing.

12. The controller of claim 9, wherein the controller is a thermostat.

13. The controller of claim 9, wherein the plurality of models are configured to determine a first plurality of temperature offsets for the first sensor based on the different airflow directions relative to the device and accounting for heat generated by the heat generating components in the thermostat; and wherein the plurality of models are configured to determine a second plurality of temperature offsets for the second sensor based on the different airflow directions relative to the device and accounting for heat generated by the heat generating components in the thermostat.

14. The controller of claim 9, wherein the processor is further configured to:

determine the first weighted average, at least in part, by determining a first score for each of the outputs of the first set of outputs of the plurality of models that is indicative of the difference between the outputs and the first predicted temperature, and applying a first weight to each of the plurality of models based on the first score to determine the first weighted average; and determine the second weighted average, at least in part, by determining a second score for each of the outputs of the second set of output of the plurality of models that is indicative of the difference between the outputs and the second predicted temperature, and applying a second weight to each of the plurality of models based on the second score to determine the second weighted average.

15. The controller of claim 9, wherein the processor is further configured to:

filter the first and second adjusted temperatures, at least in part, by using a rate saturation filter, the rate saturation filter comprising a saturation limit that is based on the difference between the first raw temperature detected and the second raw temperature detected.

16. The controller of claim 9, wherein each of the plurality of models are configured to provide a temperature offset for the first and second temperature sensors based on differences between temperatures detected by the plurality of onboard sensors, as a result of the arrangement and mount of the plurality of sensors at the different locations within the thermostat, and the temperature detected by the sensor, and a derivative of the differences between the temperatures detected by the plurality of onboard sensors.

* * * * *